United States Patent [19]
H:son Gullberg et al.

[11] 3,779,573
[45] Dec. 18, 1973

[54] LAND SAILING TRAILER

[76] Inventors: Herbert E. H:son Gullberg; Stearns Williamson, both of P.O. Box 189, Moylan, Pa. 19065

[22] Filed: Dec. 8, 1971

[21] Appl. No.: 205,908

[52] U.S. Cl. .................. 280/34 A, 280/16, 280/414
[51] Int. Cl. ............................................ B62d 21/14
[58] Field of Search .................. 280/16, 414 R, 62, 280/34 R, 34 A; 9/1 T; 115/1 R; 114/39

[56] References Cited
UNITED STATES PATENTS

| | | | |
|---|---|---|---|
| 3,155,249 | 11/1964 | Johnson | 280/414 R |
| 3,175,710 | 3/1965 | Kistner | 280/414 R |

*Primary Examiner*—Robert R. Song
*Attorney*—Karl L. Spivak

[57] ABSTRACT

Land sailing trailers having cradle means for supporting a hull of a sailboat. The cradle means is transversely rotatable about a longitudinally axis of rotation, and tension spring means limits rotation of the cradle means. Wheels support the trailers for traveling on land and one wheel is manually adjustable to steer the trailer. Ski skates are secured to the wheels when the trailer is used on snow or ice, and a trailer hitch forms a part of the trailer to permit transporting of the trailer by a powered vehicle, such as an automobile.

8 Claims, 9 Drawing Figures

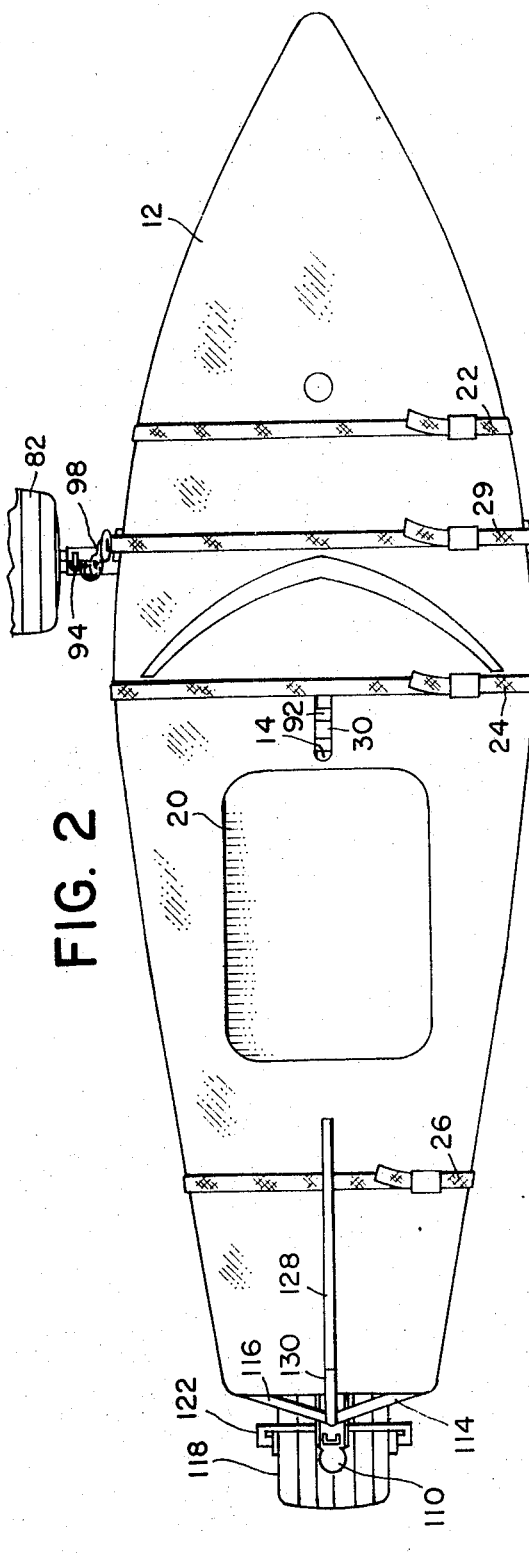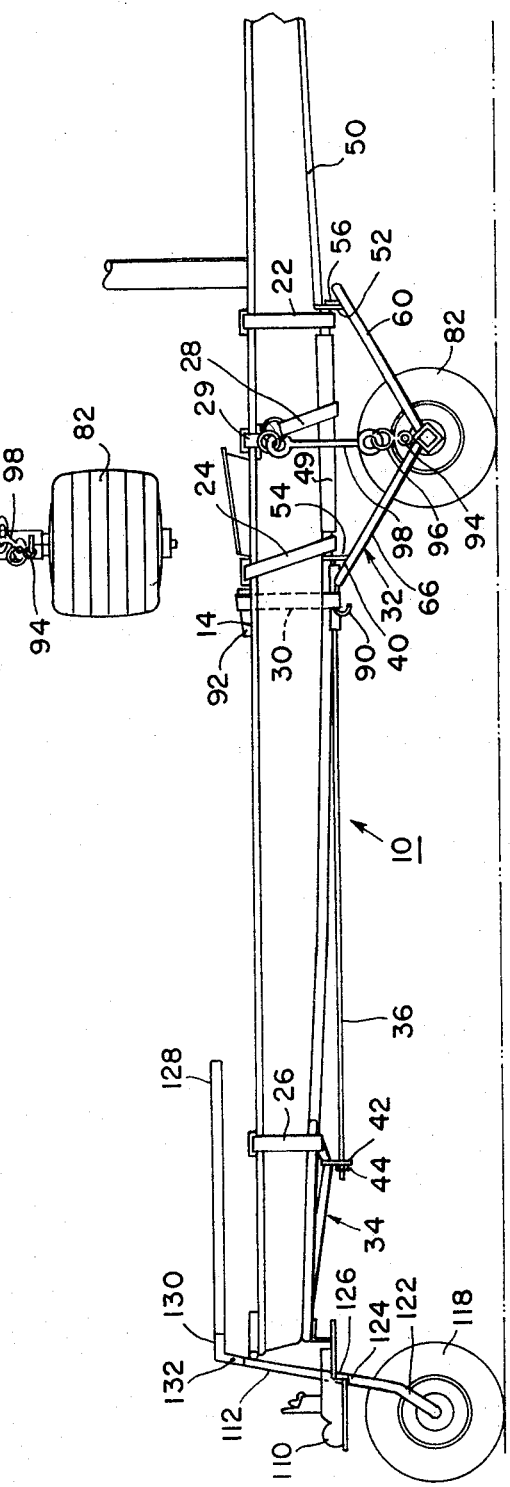

INVENTORS.
HERBERT E.H:son GULLBERG
STEARNS WILLIAMSON
BY Karl h. Spivak
ATTORNEY.

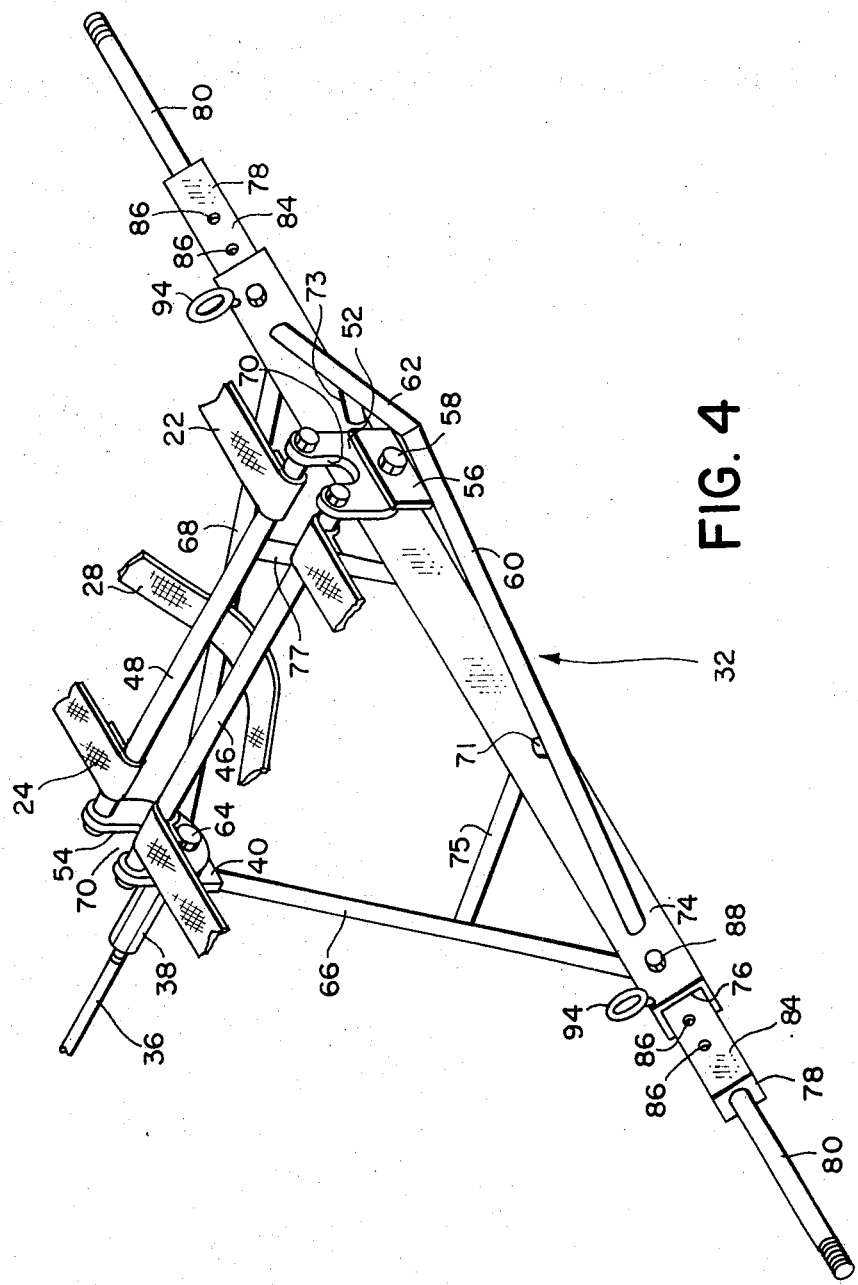

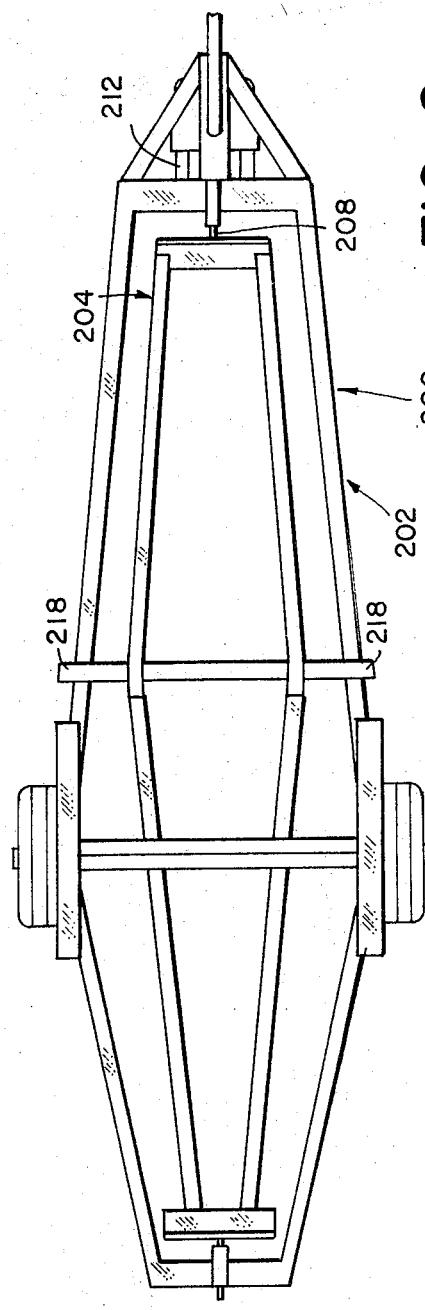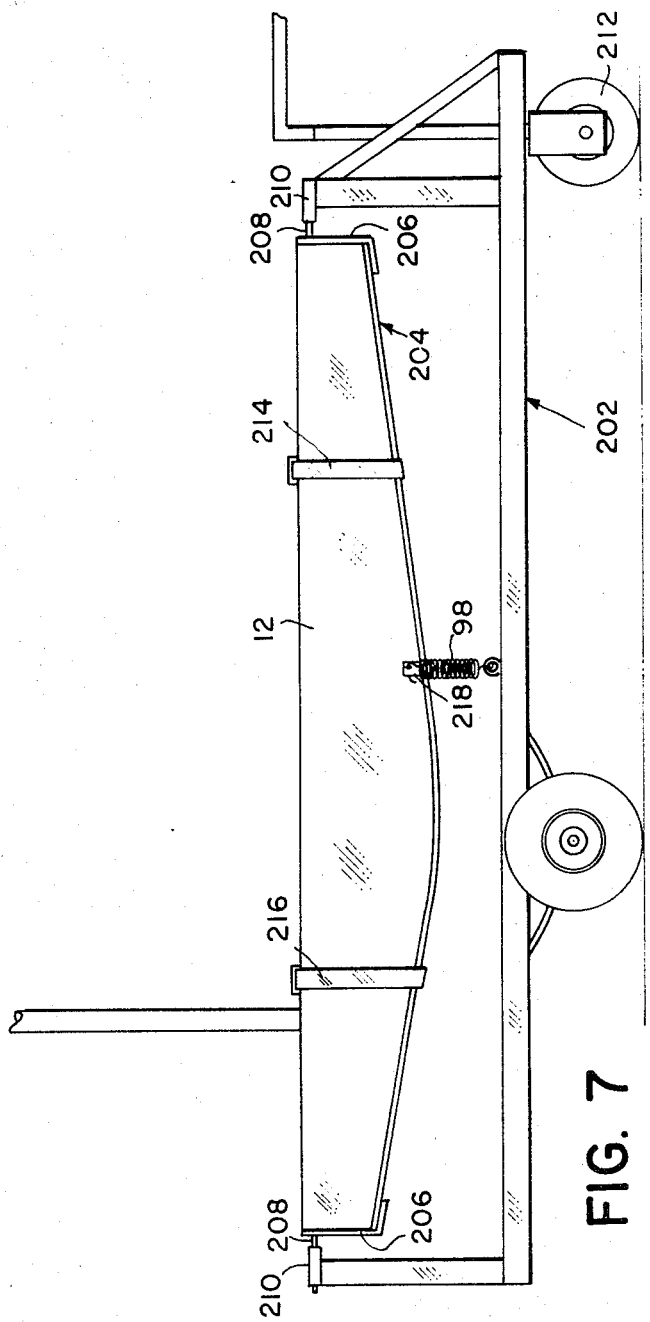

LAND SAILING TRAILER

BACKGROUND OF THE INVENTION

1. Field of the Invention

This invention relates generally to trailers, and specifically to land sailing trailers to which a sailboat can be removably secured.

2. Description of the Prior Art

Land sailing is becoming quite popular. Prior art land sailing vehicles are inadequate because they either lack the versatility of being usable in water as well as on land or because they are not constructed for motion in land sailing which simulates the motion encountered in water sailing.

Land sailing vehicles employing a plurality of wheels for rolling over the surface of the ground in response to forces imposed upon a sail secured to the vehicle are disclosed in U.S. Pat. Nos. 23,277 and 2,443,565. These vehicles cannot be converted for water use, and do not adequately simulate motion which is encountered in water sailing.

It is known to construct sailboats which are suitable for use on both land and water, as exemplified in U.S. Pat. No. 2,238,464. In this construction wheels are substituted for pontoons to convert the sailboat for land sailing. This sailboat is also inadequate because it does not adequately simulate the motion encountered in water sailing.

Sailboats for use on ice are known, as exemplified in U.S. Pat. No. 1,082,831. This construction is deficient because it cannot be employed for use in water when desired.

SUMMARY OF THE INVENTION

Land sailing trailers of this invention can be used with conventional sailboats for land sailing, and the sailboats can be removed from the trailers when water sailing is desired. The land sailing trailers include wheels for rolling over the surface of the ground, and ski skates of this invention can be secured to the wheels when sailing on ice or snow is desired.

The land sailing trailers of this invention include a longitudinally extending cradle means to which a hull of a conventional sailboat can be removably secured. The cradle means is mounted for rotational movement about a longitudinally extending axis of rotation to permit transverse tilting of a sailboat secured to the cradle means. This transverse tilting, or swiveling, of the sailboat in response to forces imposed upon the sail closely simulates the rocking action of a sailboat in water. Tension springs are employed to prevent the cradle means from completely overturning; however, these springs permit the desired swivel action required to simulate the motion encountered during water sailing. A rear wheel is mounted for rotation centrally of side margins of the trailer, and a tiller is secured to a frame supporting this wheel to permit swiveling of the wheel to steer the trailer. A trailer hitch extends rearwardly of the trailer, and the rear wheel is removable from the trailer to permit securing of the trailer to a powered vehicle, such as an automobile. In this manner the trailer can be transported to any desired location for sailing.

A pair of transversely spaced apart wheels are disposed forwardly, in an upstream direction, from the rear wheel and provide stability to the trailer during land sailing and during transporting of the trailer by a powered vehicle. These transversely spaced apart wheels are transversely adjustable and are disposed closer together when the trailer is being transported than when the trailer is being used in land sailing. The required transverse spacing between these wheels is dictated by the wind conditions and the type of sailing maneuvers employed, i.e., sailing into the wind, across the wind or before the wind.

In one embodiment of this invention the land sailing trailer includes a front section and a rear section interconnected by a connecting rod which is rotatably mounted to the front section. A front cradle supports the fore section of a sailboat and is mounted for swivel movement about a longitudinal axis of rotation. The rear section defines an upper rear cradle surface for supporting the rear, or aft section of the sailboat. The boat is removably secured to the front and rear sections of the trailer by belts or straps. When the front cradle swivels in response to forces imposed upon the sail, the swivel motion will be transmitted to the boat through the securing belts. The swivel motion of the boat will be transmitted to the rear section of the trailer, and this rear section will swivel by virtue of the rotational interconnection between the connecting rod and the front section of the trailer. The rear wheel is secured to the rear section of the trailer and will also swivel to enhance the rocking action of the boat during land sailing.

In a second embodiment of this invention, the land sailing trailer includes a longitudinally extending main body portion which does not swivel. A longitudinally extending cradle is secured to the main body portion and is mounted for swivel movement about a longitudinally extending axis of rotation. Belts or straps removably secure a sailboat to this cradle.

BRIEF DESCRIPTION OF THE DRAWINGS

FIG. 1 is a side elevation view of a land sailing trailer according to this invention with a sailboat secured thereto;

FIG. 2 is a top plan view of FIG. 1;

FIG. 4 is an isometric view of the front section of the land sailing trailer of this invention with parts removed for purposes of clarity;

FIG. 7 is a side elevation of a second embodiment of a land sailing trailer according to this invention with a sailboat secured thereto;

FIG. 8 is a top plan view of the land sailing trailer shown in FIG. 7; and

DESCRIPTION OF THE PREFERRED EMBODIMENTS

Figure 3:
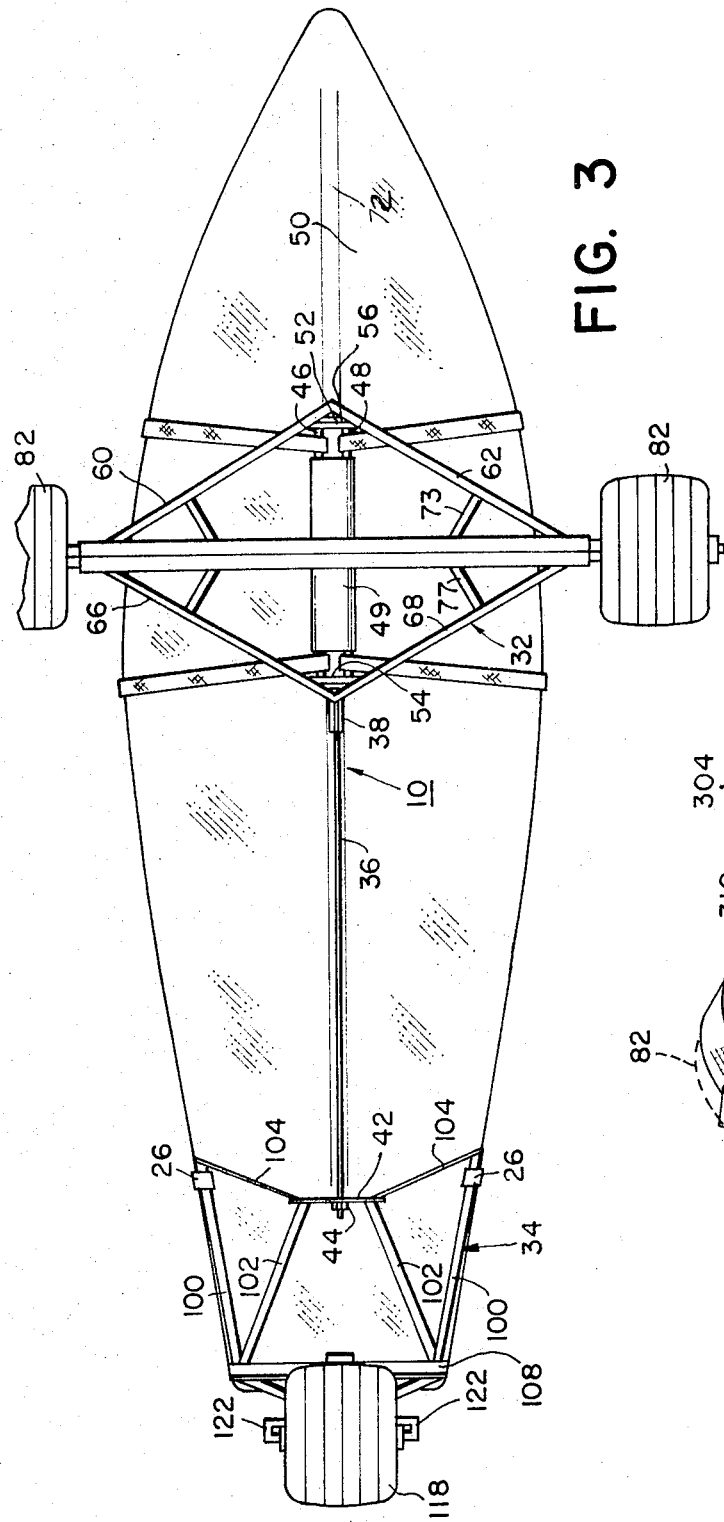
FIG. 3 is a bottom plan view of FIG. 2.

Referring to FIGS. 1-3, a land sailing trailer 10 of this invention supports a hull 12 of a sailboat. Any type of boat with a sail affixed thereto can be secured to the land sailing trailer 10. Preferably, the sailboat has a hull 12 with an elongate opening 14 extending through the longitudinal center-line thereof to receive a centerboard for preventing movement of the sailboat to either side when the sailboat is used in water. The hull 12 conventionally is comprised of a bow, or fore section 16; a stern, or aft section 18 and a seating compartment 20. A plurality of belts or straps 22, 24 and 26 are secured to the land sailing trailer 10 and about the hull 12 of the sailboat to secure firmly the hull to the land sailing trailer in a manner which will be described hereinafter. Additional belts or straps 28, 29 and 30 also serve to retain the hull 12 of the sailboat to the land sailing trailer 10 in a manner which will be described hereinafter.

Referring to FIGS. 1 and 3, the land sailing trailer 10 has a fore or front section 32, an aft, or rear section 34 and connection means connecting the front section to the rear section. The connection means includes a longitudinally extending connecting rod 36 which is threaded at opposite ends. One threaded end is rotatably secured to an internally threaded shaft member 38 which is welded to an upstanding plate member 40 of the front section 32. The opposite threaded end is threaded into an opening of a downwardly extending plate member 42 of the rear section 34. A lock nut 44 is threaded onto the end of connecting rod 36 which extends through plate member 42 to secure the connecting rod 36 to the rear section 34. The threaded connection between connecting rod 36, shaft member 38 and plate member 42 permits longitudinal adjustment of the distance between the front section 32 and rear section 34 of the land sailing trailer 10 to accommodate boats of varying longitudinal dimensions. Alternatively, different length connecting rods can be secured to the front and rear sections of the trailer 10 to vary the separation between said sections.

Figure 6:
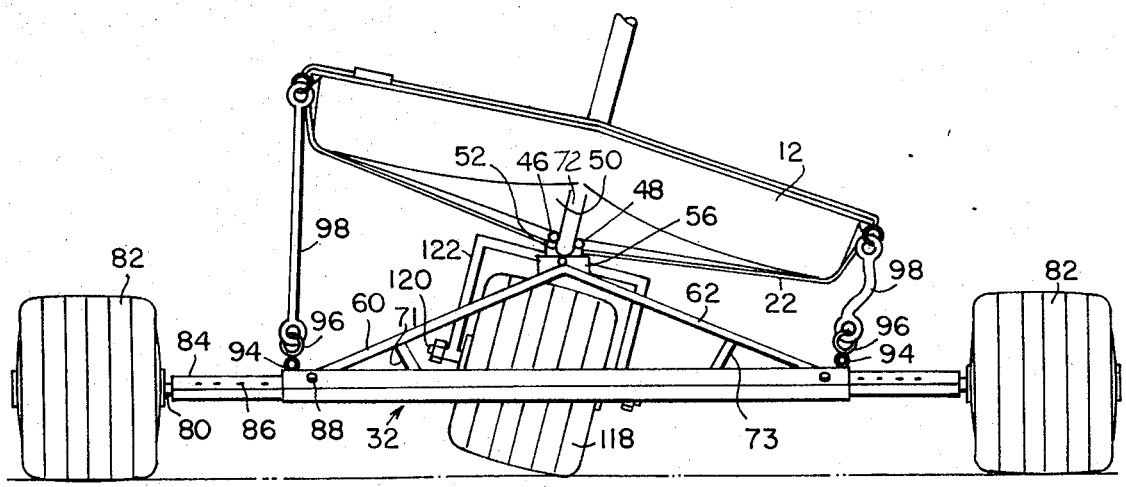
FIG. 6 is a front elevation view of FIG. 1, showing the position of the sailboat and land sailing trailer when the sailboat is in a transverse tilted position.

Referring to FIGS. 1, 3, 4 and 6, the front section 32 of the land sailing trailer 10 will be described. The front section 32 has a pivotally mounted front cradle which includes longitudinally extending, transversely spaced apart support rods or bars 46 and 48 for supporting bottom wall 50 of the hull 12. A flexible cushioning web 49 is disposed about the support rods 46 and 48 to provide a cushioning support for the hull 12. The cushioning web 49 is omitted from FIG. 4 for purposes of clarity. The support rods 46 and 48 are secured at their opposite ends to upstanding, pivotally mounted support plates 52 and 54. The support plate 52 is secured to an upstanding plate member 56 by a pivot pin 58, and the upstanding plate member 56 is secured, by welding or the like, to angle rods 60, 62. The support plate 54 is secured to the upstanding plate member 40 by a pivot pin 64, and the upstanding plate member 40 is secured, by welding or the like, to angle rods 66, 68. The support plates 52 and 54 have upwardly opening channels 70 which are in longitudinal alignment with each other and with the space between support rods 46 and 48 to receive a longitudinally extending rib 72 which depends in a downward direction from the bottom wall 50 of the hull 12 (FIG. 6).

The angle rods 60, 62, 66 and 68 are welded to a transversely extending axle supporting tube 74 to vertically space the pivotally mounted front cradle from said axle supporting tube 74. Supporting rods 71, 73, 75 and 77 are welded to angle rods 60, 62, 66 and 68, respectively, and to the axle supporting tube 74 to add rigidity to the front section 32 of the land sailing trailer.

The axle supporting tube 74 has inner walls defining openings 76 of polygonal cross-section extending axially inwardly from opposite ends thereof for adjustably receiving axles 78 therein. Each axle 78 includes an outer cylindrical shaft 80 for rotatably receiving a wheel 82 thereon. The free end of each cylindrical shaft 80 is externally threaded to receive an internally threaded lock nut to positively retain the wheel 82 on said shaft. Each axle 78 further includes an inner section 84 having the same polygonal cross-section as openings 76, and being axially adjustable within said openings. The inner section 84 of each axle 78 includes axially spaced, internally threaded openings 86 therein. Each opening 86 can be aligned with an opening in the axle supporting tube 74 for receiving an externally threaded locking screw 88 to firmly secure each axle 78 in a number of different axially disposed positions within the said axle supporting tube. The purpose for providing axial adjustability of axles 78 will be set forth later in this application.

Referring to FIGS. 1, 2 and 4, each strap 22 and 24 has separate sections having one end secured to each of the support rods 46 and 48. The opposite ends of the separate sections of each strap 22 and 24 are overturned upon the top of the hull 12 and secured to each other by an suitable buckle arrangement, such as those which are utilized in automobile safety belts.

Referring to FIG. 1, a downwardly inturned hook member 90 is welded at the junction of angle rods 66 and 68, and said hook member extends generally in an aft direction. The strap 30 is wrapped about the hook member 90 and about a wedge-shaped block 92 adapted to be disposed within the opening 14 in the hull which is normally adapted to receive a centerboard. When the wedge-shaped block 92 is disposed within the opening 14, the strap 30 will be wedged between the elongate walls defining opening 14, and the sides of the wedge-shaped block 92. Therefore, strap 30 cooperates with straps 22 and 24 to firmly retain the hull 12 to the front section 32 of the land sailing trailer 10.

Referring to FIGS. 1, 4 and 6, the construction for preventing excessive rotational displacement of the sailboat on the pivotally mounted front cradle of the front section 32 will be described. An eyelet 94 is welded to, or threadedly secured to axle supporting rod 74 at each axial end thereof. A hook member 96 has one end engaged within each eyelet and its opposite end secured to a tension spring member 98 which preferably is an elongate elastomeric member. The opposite end of each spring member is secured to one end of a belt section of belt 29. The opposite ends of the belt sections of belt 29 are wrapped about the top surface of the hull 12 and are secured together in any desirable manner, such as in the manner of automobile safety belts. An elongate belt 28 has opposed marginal ends secured at the junction of each spring member 98 with its respective section of belt 29. This elongate belt 28 extends around the support rods 46 and 48 of the front cradle to provide further retention for the sailboat on the front cradle. When the forces imposed upon the sail of the sailboat causes the sailboat to swivel to the position shown in FIG. 6, one tension spring elongates, and imposes a force on the boat which opposes the forces imposed upon the sail. The tension springs are properly designed to permit swiveling of the boat but to prevent the front cradle from completely overturning.

Figure 5:
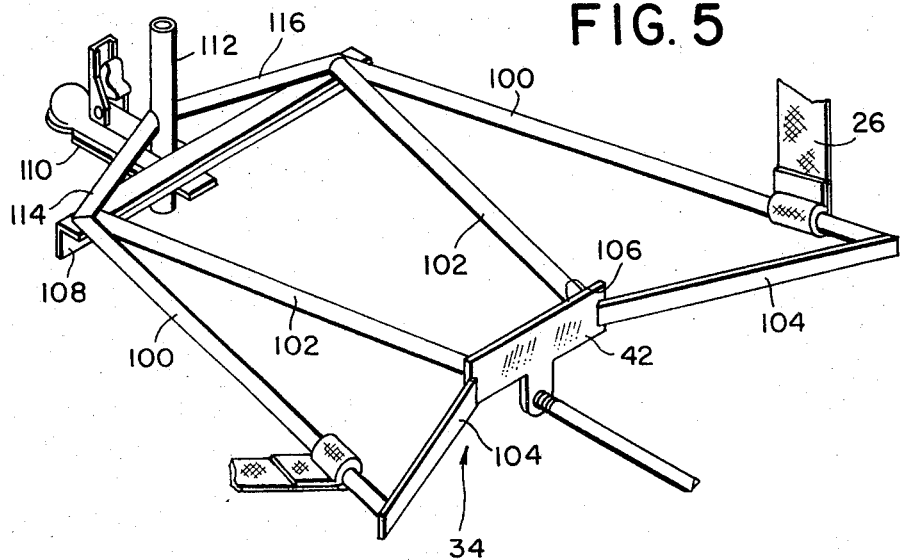
FIG. 5 is an isometric view of the rear section of the land sailing trailer of this invention.

Referring to FIGS. 1, 3 and 5, the rear section 34 of the land sailing trailer 10 has structural support members 100, 102 and 104 which cooperate with the upper surface 106 of the plate member 42 to define a rear cradle for supporting the bottom wall 50 of the hull 12. Belt sections of belt 26 are secured to support members 100 and are secured about the hull 12 to secure the hull 12 to the rear section 34. The rear ends of the support members 100 and 102 are welded to a transversely extending L-shaped channel member 108, and a trailer hitch 110 is welded to this L-shaped channel member and extends rearwardly thereof. A vertically extending hollow shaft 112 extends through the trailer hitch 110 adjacent the channel member 108, and is welded to the trailer hitch and upstanding angle members 114, 116.

A rear wheel 118 is rotatably mounted on an axle 120 which is secured within spaced legs 122 of an axle mounting frame 124. The axle mounting frame includes an upstanding vertical rod 126 which is removably disposed within hollow shaft 112. The upstanding rod 126 extends completely through the hollow shaft 112, and a tiller member 128 is secured through an angle connector 130 to the free end of said rod. A pin 132 extends through the angle connector 130 and an opening in the upstanding rod 126 (not shown) to firmly lock the upstanding rod against rotational movement relative to said angle connector. The tiller member 128 is in the form of an elongate rod which is received within a hollow open end of the angle connector 130. By turning the tiller member 128 in a horizontal plane the rear wheel 118 is turned to steer the land sailing trailer 10. When it is desired to transport the land sailing trailer with a powered vehicle, such as an automobile, the axle mounting frame 124 including the rear wheel 118 is removed from the trailer, and the rear trailer hitch 110 is secured to the powered vehicle.

Referring to FIG. 6, it can be seen that pivotal motion of the front cradle is transmitted to the rear section 34 through the hull 12 which is secured to the front cradle and rear section 34 of the land sailing trailer. Since the connecting rod 36 is rotatably secured to the internally threaded shaft 38, the rear section 34 is free to rotate. In rotated position the rear wheel 118 cants, and thereby causes a rearward dip of the land sailing trailer to further simulate the boat motion encountered in water sailing.

When the land sailing trailer is being transported on the back of a vehicle, the transversely spaced wheels 82 are disposed relatively close together. However, when the trailer 10 is being used in land sailing, the transverse spacing between wheels 82 is widened to provide sufficient stability for the trailer. The specific distance required between wheels 82 is dictated by the wind conditions and the type of sailing maneuvers employed, i.e., sailing into the wind, across the wind or before the wind.

Referring to FIGS. 7 and 8, a second embodiment of a land sailing trailer 200 includes a main body portion 202 to which a cradle 204 is secured. The cradle 204 includes upstanding end members 206 with pins 208 extending outwardly therefrom and disposed within hollow shaft members 210, whereby the cradle is mounted for swivel movement on the main body portion 202 along a longitudinal axis of rotation. A rear wheel 212 is secured to the main body portion 202 in the same manner as rear wheel 118 is secured to the rear section 34 of the land sailing trailer 10. A hull 12 of a sailing boat is secured to the cradle 204 by belts 214, 216.

In this embodiment of the invention, the tension springs 98 are secured to the main body portion 202, and to transversely extending arms 218 of the cradle 204 to prevent excessive swiveling of said cradle.

Figure 9:
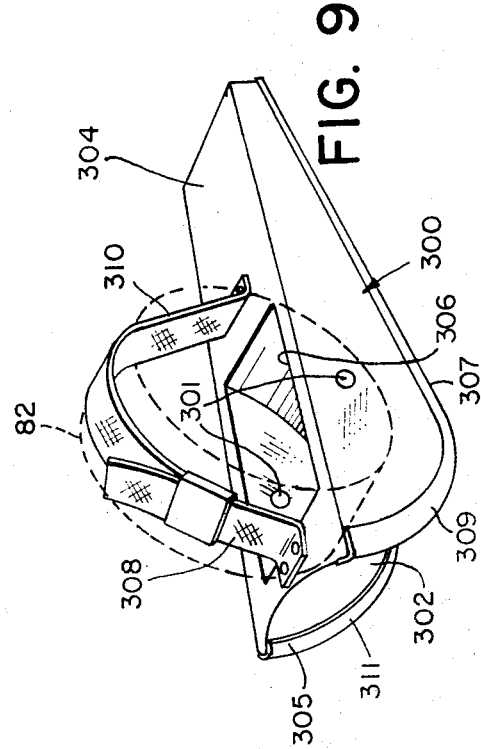
FIG. 9 is an isometric view of a ski adapter for use with the land sailing trailer according to this invention.

Referring to FIG. 9, a ski skate 300 for use in conjunction with the land sailing trailers 10 and 200, includes a bottom surface 302 which is centrally recessed to define transversely spaced, longitudinally extending runners 305, 307 adapted to glide on ice or snow. The runners 305, 307 preferably are provided with steel edges 309, 311 to provide wear resistance for the runners. An upper surface 304 has a wheel receiving compartment 306 therein for receiving a wheel of a land sailing trailer as shown in dotted representation. Strap sections 308, 310 are secured to the upper surface 304 of the ski skate and are disposed about the outer periphery of the wheel and secured together to positively retain the wheel within the ski skate. Transversely aligned openings 301, 303 are provided through side walls of the ski skate which partially define the wheel receiving compartment to receive a wheel mounting axle when the wheel is removed therefrom. Therefore, the ski skate 300 can be utilized on land sailing trailers which do not have wheels thereon.

We claim:

1. A land sailing trailer having a rearward end and a forward end, for supporting a boat having a hull including sides, a bottom wall, a forward end and a rearward end, comprising:
   A. a longitudinally extending cradle for supporting a hull of a sailboat,
      1. said cradle having a longitudinally extending axis of rotation;
   B. securing means for removably securing a sailboat to said hull supporting cradle;
   C. mounting means for rotationally supporting said cradle about the longitudinally extending axis of rotation;
   D. longitudinally spaced apart wheel supporting means connected to the cradle for rotatably supporting a plurality of wheels thereon,
      1. said wheel supporting means including transverse wheel adjustment means to vary the transverse spacing between some of said wheels; and
   E. spring means for limiting rotational movement of said cradle means to prevent said cradle from overturning,
      1. said spring means biasing between the cradle and a portion of the wheel supporting means.

2. The land sailing trailer according to claim 1, further including a hollow shaft extending substantially vertically adjacent the rearward end of said trailer, said wheel supporting means further including a first axle for rotationally receiving a first wheel thereon, a first wheel supported on said first axle, a first axle mounting frame for supporting said first axle in a substantially horizontal plane, said first axle mounting frame including a substantially vertically extending rod terminating in a free end and being removably received and rotatably mounted within said hollow shaft, and a tiller member secured to said rod for maintaining said rod within said hollow shaft and for rotating said rod within said hollow shaft to steer the land sailing trailer.

3. The land sailing trailer according to claim 1, comprising a front section and a rear section interconnected by a connecting rod, said front section including a longitudinally extending front cradle adapted to support the forward end of a sailboat, the said front cradle being mounted for transverse rotational movement about the longitudinally extending axis of rotation, said rear section including a rear cradle for supporting the rearward end of a sailboat, connection means for rotatably securing said connecting rod from said front section about substantially the same longitudinally extending axis of rotation as said front cradle to permit rotation of the rear section of the land sailing trailer when the sailboat is secured to said front and rear cradles and said front cradle is rotated about its longitudinally extending axis of rotation.

4. The land sailing trailer according to claim 3, wherein said wheel supporting means further includes a transversely extending second axle, said second axle comprises a transversely extending second axle supporting tube having inner walls defining axially inwardly directed openings from opposite ends thereof, a forward wheel axle mounted for axial movement in each of said openings, and means for securing each of said forward wheel axles against axial movement in different axial positions within its respective opening to permit adjustment of the transverse space between wheels mounted on each of said forward wheel axles.

5. The land sailing trailer according to claim 3, wherein said front cradle comprises longitudinally extending, transversely spaced apart support rods for supporting the bottom wall of the hull of a sailboat.

6. The land sailing device according to claim 4 wherein said securing means includes belt sections adapted to be disposed about opposite sides of a sailboat and having adjacent ends adapted to be secured to each other.

7. The land sailing trailer according to claim 4 comprising a main body portion having said hollow shaft disposed adjacent the rearward end thereof, said means for supporting said forward wheel axles forming a part of said main body portion and being disposed upstream of said hollow shaft, said cradle having opposed ends rotatably secured to said main body portion to define a longitudinally extending axis of rotation for the said cradle and said cradle having longitudinally extending side margins.

8. The land sailing trailer according to claim 7, wherein said spring means comprises at least one tension spring disposed adjacent each longitudinally extending side margin of said cradle, said tension springs having two ends, one end of each of said tension springs being secured to said main body portion, and the opposite end of each of said tension springs being secured to said cradle.

* * * * *